(12) United States Patent
Bradt

(10) Patent No.: US 6,194,660 B1
(45) Date of Patent: Feb. 27, 2001

(54) WEDGE-TITE CABLE CLAMP

(76) Inventor: Doug Bradt, 25926 CR 22, Elkhart, IN (US) 46517

( * ) Notice: Subject to any disclaimer, the term of this patent is extended or adjusted under 35 U.S.C. 154(b) by 0 days.

(21) Appl. No.: 09/340,803

(22) Filed: Jun. 28, 1999

(51) Int. Cl.[7] ....................................................... H02G 3/18
(52) U.S. Cl. .......................... 174/65 R; 174/135; 174/64; 248/56; 16/2.1; 16/2.2; 29/735; 29/868
(58) Field of Search ............................... 174/65 R, 65 SS, 174/65 G, 152 G, 153 G, 135, 64; 248/56, 62, 63; 16/2.1, 2.2; 220/3.2, 3.8; 29/729, 735, 868, 825

(56) References Cited

U.S. PATENT DOCUMENTS

| 1,827,249 | 10/1931 | McCoy . | |
|---|---|---|---|
| 4,209,661 | 6/1980 | Pate et al. | 174/65 R |
| 4,414,427 | 11/1983 | Slater et al. | 174/65 R |
| 4,591,658 | 5/1986 | Bauer et al. | 174/65 R |
| 4,605,816 | * 8/1986 | Jorgenson et al. | 174/65 R |
| 4,724,282 | * 2/1988 | Troder | 174/65 R |
| 5,403,976 | 4/1995 | Maurice | 174/65 R |
| 5,932,844 | * 8/1999 | MacAller et al. | 174/65 R |
| 5,984,703 | * 11/1999 | Weingartner | 439/181 |

* cited by examiner

Primary Examiner—Dean A. Reichard
Assistant Examiner—Dhiru R Patel
(74) Attorney, Agent, or Firm—Baker & Daniels

(57) ABSTRACT

The present invention involves a cable clamp for securing an electrical cable within the aperture or "knock-out" of an electrical distribution panel. The cable clamp is a single piece of molded material, with a wedge-shaped head portion, having a hypotenuse side with at least one angled step, a base side with at least one angled step depending inward, a tail side substantially perpendicular to the base side, and a tail portion extending from the tail side away from the hypotenuse side for hand gripping. The clamp is inserted between a cable and an interior wall of the knock-out opening until a right angled step passes thorough the knock-out opening, thereby locking the clamp into position with the cable firmly and securely held between an obtusely angled step of the clamp and an interior wall of the knock-out opening. The number and size of the obtusely angled and right angled steps on the clamp may be varied to accommodate cables and knock-outs of various sizes.

16 Claims, 2 Drawing Sheets

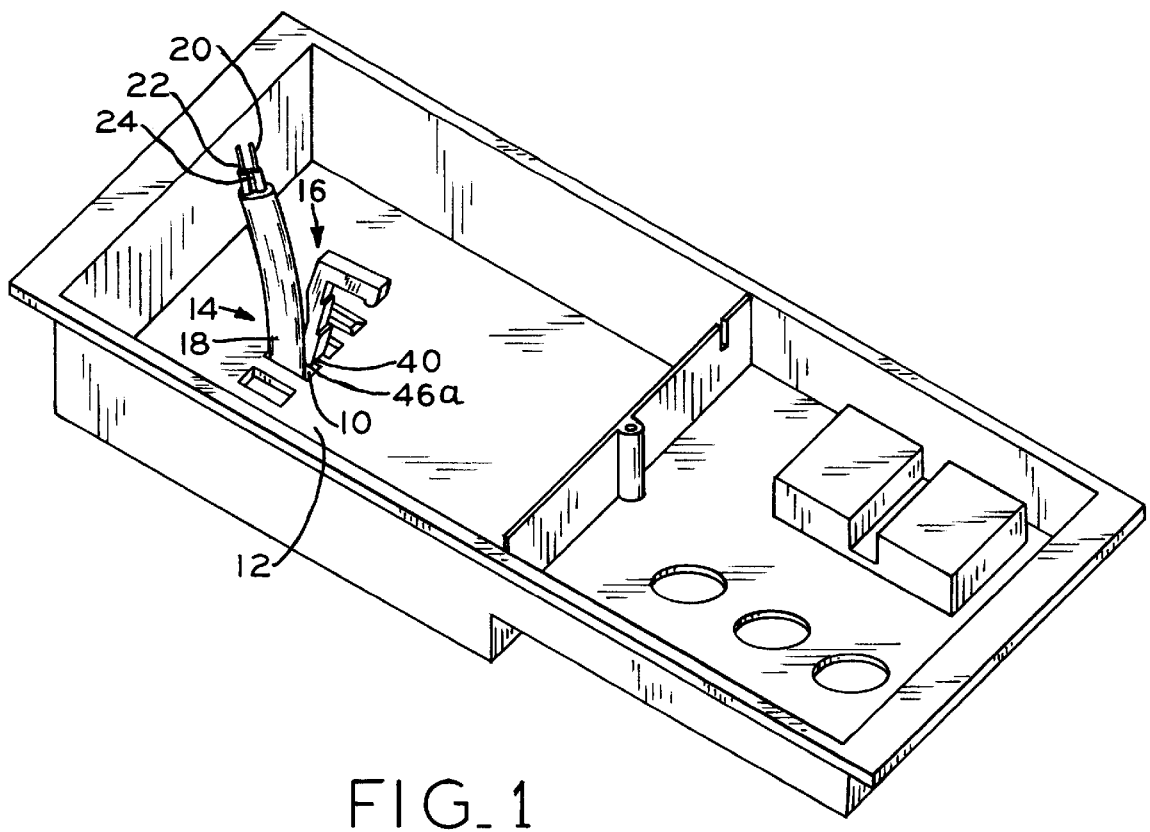
FIG_1
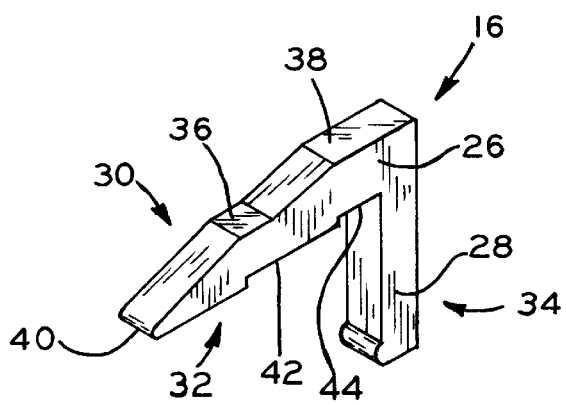
FIG_2

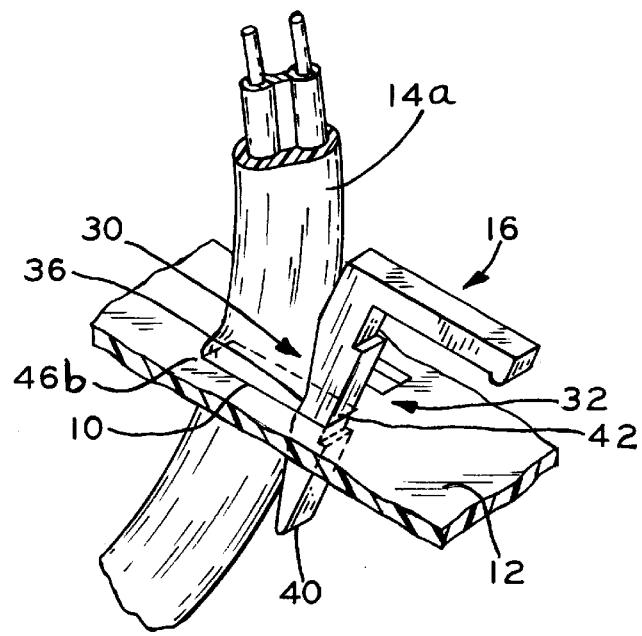
FIG_3
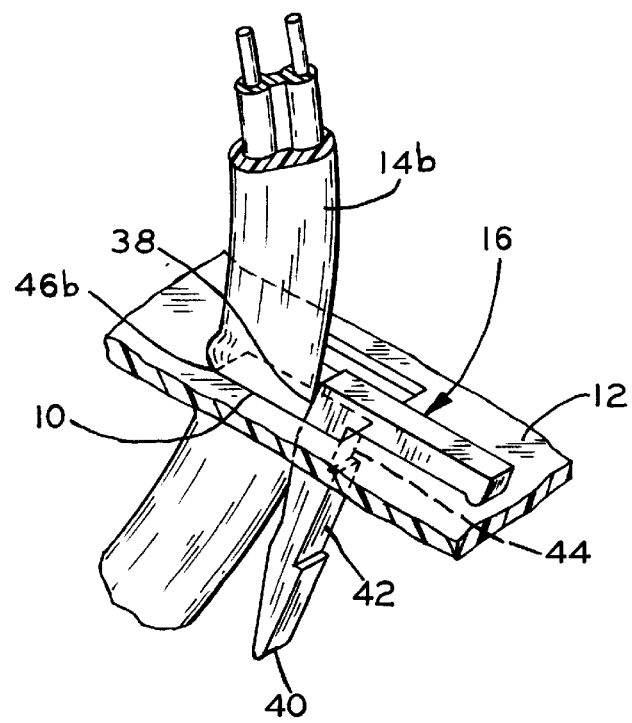
FIG_4

WEDGE-TITE CABLE CLAMP

BACKGROUND OF THE INVENTION

1. Field of the Invention

The present invention relates to cable clamps for use with electrical distribution panels, outlet boxes, load centers, or the like, which are commonly used in campers, mobile homes, or other recreational vehicles to branch a main electrical current to various auxiliary devices.

2. Background Art

A variety of devices are used to secure electrical cables in the branch circuit apertures of electrical distribution panels. These cables are typically of rounded rectangular shape with nonmetallic insulation sheathing surrounding a pair of metallic wires. The distribution panel housings are typically made of non-conductive polymer material. Typically, the apertures in electrical distribution panels through which the cables are inserted are formed with removable plastic windows, or "knock-outs", which temporarily cover the apertures until they are removed to allow insertion of electrical cables.

Clamping electrical cables in the apertures or knock-outs of electrical distribution panels in a manner that they cannot be easily pulled out or dropped into the outlet box is highly desirable for practical purposes, and is required by various industry codes. Conventionally, in the housing of an electrical distribution panel, electrical cables are secured by a variety of clamp-type or other devices. Some examples include molding cable clamps integrally with the electrical distribution panel housing; internal clamps comprising a single piece of material, such as an internal wedge member, for grasping the cable and which is incapable of moving through the knock-out opening; or forming the knock-outs with closure panels which remain connected to the interior walls of the knock-out opening and bear against the cable after insertion to hold the cable within the knock-out opening.

Some disadvantages encountered with conventional devices for securing the cables within the knock-outs of electrical distribution panels include the necessity of molding such devices within or contemporaneously with the panels, increasing the expense and complication of tooling and manufacture. In addition, many conventional devices frequently require additional tools or screwing steps for insertion of the cables. The integral serrations or "teeth" of conventional devices which secure the cable can cut into the insulation around the cable wire, which can compromise the conductivity of the cable by partially striping the cable insulation from the metallic wire when pulling strain is applied to the cable. Finally, many conventional cable clamps are specifically configured for securing cables of a single diameter size or gauge within the knock-out opening.

SUMMARY OF THE INVENTION

The present invention provides a cable clamp for securing a cable within a knock-out opening of an electrical distribution panel. The cable clamp consists of a wedge shaped head portion and a tail portion. The wedge shaped head portion is generally in the shape of a triangle, with hypotenuse, base, and tail sides. The hypotenuse side contains at least one relatively flat step parallel to the base side. The base side merges with the hypotenuse side at an acute angle to form a tip end, and has at lease one right angled step depending inward whereby each right angled step is positioned complimentary to the flat steps on the hypotenuse side. The tail side is transverse to the base side, and contains a tail portion which extends beyond the base side away from the hypotenuse side.

After the cable is initially inserted through the knock-out opening of an electrical outlet box, the tip end of the head portion of the clamp is inserted into the knock-out opening, squeezing the cable between the head portion of the camp and the interior wall of the knock-out opening. The tail portion facilitates hand gripping and provides a surface for hand pressing the clamp into position. For a relatively thicker diameter size cable, the clamp is pressed through the opening until the first step on the base side of the wedge shaped head portion passes through the opening, thereby locking the clamp into position with the cable securely pressed between the first obtusely angled step on the hypotenuse side and the interior wall of the knock-out opening. For a relatively thinner diameter size cable, the clamp is pressed through the opening until the second step on the base side of the wedge shaped head portion passes though the opening, thereby locking the clamp into position with the cable securely pressed between the second obtusely angled step on the hypotenuse side and the interior wall of the knock-out opening.

The clamp may be inserted from either the inside or outside of the housing of the electrical distribution panel, and no screwing steps, additional tools or other installation devices are required for installation. The rectangular knock-out opening of the housing cooperates with the shape and size of the clamp to provide these features. The clamp may be formed of a single piece of molded plastic material, which may be easily manufactured. In addition, the clamp lacks the integral serrations or "teeth" of previous designs, and therefore provides strain relief by merely indenting the insulation sheathing without either cutting through the insulation sheathing of the cables or partially stripping the insulation sheathing from the metallic wire when pulling strain is applied to the cable.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a perspective view of a housing of an electrical distribution panel, showing the wedge shaped cable clamp, and a cable inserted through the rectangular knock-out opening.

FIG. 2 is a perspective view of a cable clamp in accordance with the present invention, showing a pair of obtusely angled steps on the hypotenuse side, a pair of right angled steps on the base side, the tail side, and tail portion.

FIG. 3 is a perspective view, showing the wedge shaped cable clamp inserted through the knock-out opening and securing a first, relatively thicker diameter cable at the first wedge step.

FIG. 4 is a perspective view, showing the wedge shaped cable clamp inserted though the knock-out opening and securing a second, relatively thinner cable at the second wedge step.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DETAILED DESCRIPTION OF THE INVENTION

The embodiments disclosed below are not intended to be exhaustive or limit the invention to the precise forms disclosed in the following detailed description. Rather, the embodiments are chosen and described so that others skilled in the art may utilize its/their teachings.

FIG. 1 shows knock-out opening 10 within electrical distribution panel housing 12, cable 14, and cable clamp 16. Electrical distribution panel housing 12 generally includes an outlet box or load center type commonly installed in recreational vehicles or the like to handle the 120 volt AC and 12 volt DC distribution (including, for illustrative purposes and not limited to, Todd Engineering Sales Model LC30 Load Center), and may be of a variety of shapes and sizes. Distribution panel housing 12 is supplied with electric current from a power source (not shown) through an attached power cord (not shown). Distribution panel housing 12 contains an aperture, or knock-out opening 10, as well as a plurality of additional knock-out openings (not shown) to receive branch circuit cables. A removable plastic cover or window (not shown) may be integrally molded with distribution panel 12, and temporarily covers knock-out opening 10 and is removed or "knocked out" prior to insertion of branch circuit cable 14 into distribution panel 12.

Knock-out opening 10 is generally rectangular in shape. Cable 14 is an oval, rounded rectangular, or round type non-metallic sheathed cable common in the art, such as ROMEX® cable (ROMEX is a registered trademark of General Cable Industries, Inc.), with a deformable, nonmetallic insulation sheathing 18 surrounding a hot conductor 20, a neutral conductor 22 and ground 24. Standard industry diameter sizes for cable 14 include 10 gauge 12 gauge and 14 gauge. Opening 10 and clamp 16 may be shaped and sized in accordance with the present invention to function with these and several other shapes and sizes of cables.

Referring to FIG. 2, cable clamp 16 comprises wedge-shaped head portion 26 and tail portion 28. Wedge-shaped head portion 26 may be generally in the shape of a right triangle (as shown), with hypotenuse side 30, base side 32, and tail side 34, or alternatively may have one of many other shapes having at least one wedge-shaped portion. Hypotenuse side 30 contains first obtusely angled step 36 and second obtusely angled step 38, both parallel to base side 32. Base side 32 and hypotenuse side 30 meet at an acute angle to form tip end 40. Base side 32 contains first right angled step 42 and second right angled step 44, both depending inward toward the center of head portion 26. First right angled step 42 and second right angled step 44 are positioned complimentary to and substantially parallel first obtusely angled step 36 and second obtusely angled step 38. Tail side 34 is perpendicular to base side 32, and meets with hypotenuse side 30 at second obtusely angled step 38, forming a right angle. Tail side 34 contains tail portion 28, which extends beyond base side 32 away from hypotenuse side 30. Tail portion 28 facilitates hand gripping and provides a surface for hand pressing clamp 16 into position within knock-out opening 10. Clamp 16 may be formed of a rigid material, such as a hard, plastic material like Polyvinyl Chloride (PVC), Acrylonitrile-Butadiene-Styrene (ABS), phenolic, and the like, and may be molded as a single piece using injection molding.

As shown in FIG. 1, cable 14 is first inserted through knock-out opening 10 of distribution panel housing 12. Cable 14 may be inserted through knock-out opening 10 from either the inside or outside of distribution panel housing 12. Insulation sheathing 18 of cable 14 should extend at least 0.25 inches or more into the interior of distribution panel housing 12. Tip end 40 of head portion 26 of clamp 16 is then inserted into knock-out opening 10 adjacent cable 14 between cable 14 and interior wall 46a of knock-out opening 10.

Referring to FIG. 3, for relatively thicker 12 gauge cable 14a, clamp 16 is pressed through knock-out opening 10 until first angled step 42 on base side 32 passes through knock-out opening 10, thereby locking clamp into a secure position such that clamp 16 cannot be pulled out of knock-out opening 10. When clamp 16 is locked into such a position, 12 gauge cable 14a is squeezed between first obtusely angled step 36 on hypotenuse side 30 and interior wall 46b of knock-out opening 10 such that 12 gauge cable 14a cannot be pulled out of knock-out opening 10.

Referring to FIG. 4, for relatively thinner 14 gauge cable 14b, clamp 16 is pressed through knock-out opening 10, until second angled step 44 on base side 32 passes though knock-out opening 10, thereby locking clamp 16 into a secure position such that clamp 16 cannot be pulled out of knock-out opening 10. When clamp 16 is locked into such position, 14 gauge cable 14b is squeezed between second angled step 38 on hypotenuse side 30 and interior wall 46b of knock-out opening 10 such that 14 gauge cable cannot be pulled out of knock-out opening 10.

Referring to FIGS. 3 and 4, cable 14 is held in position within knock-out opening 10 by squeezing cable 14 and indenting nonmetallic insulation sheathing 18 of cable 14 between first and second angled steps 36 and 38 and interior wall 46b of knock-out opening 10, neither of which surfaces cut into the insulation sheathing 18 when strain is applied to cable 14. Securing cable 14 in knock-out opening 10 using clamp 16 therefore provides strain relief and prevents cutting of insulation sheathing 18 or partial stripping of cable 14.

As shown in FIGS. 1–4, head portion 26 of clamp 16 contains first and second angled steps 36 and 38, and first and second angled steps 42 and 44. First angled step 36 and first angled step 42 correspond to relatively thicker 12 gauge cable, as indicated on clamp 16.

Second angled step 38 and second angled step 44 correspond to relatively thinner 14 gauge cable, as indicated on clamp 16. In the disclosed embodiment, angled steps 36 and 38 are generally obtuse while angled steps 42 and 44 are generally right angles. However, it should be understood that both obtusely angled steps and right angled steps may be formed on clamp 16 in varying sizes in order to accommodate varying thicknesses of cable, if desired, other than the standard sizes of 12 gauge and 14 gauge. In addition, clamp 16 may contain only a single obtusely angled step and right angled step, as well as three or more such steps, depending on the application desired.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A cable clamp assembly for securing an electrical cable in an aperture of an electrical distribution panel, comprising:

an electrical distribution panel housing including a wall with an aperture sized to accommodate an electrical cable; and a cable clamp with a wedge-shaped head portion having a hypotenuse side with at least one first angled step, a base side forming anangled tip end with said hypotenuse side, said base side substantially parallel with said at least one first angled step and having at least one second angled step from the tip end depending inward, and a tail side transverse to said base side, said head portion positioned in said aperture.

2. The cable clamp assembly of claim 1, wherein said tail side contains a tail portion extending perpendicularly from said tail side beyond said base side and away from said hypotenuse side.

3. The cable clamp assembly of claim 1, wherein said hypotenuse side contains aplurality of obtusely angled steps and said base side contains a plurality of right angled steps.

4. The cable clamp assembly of claim 1, wherein said cable clamp is formed from a single piece of plastic material.

5. A cable clamp assembly for securing an electrical cable in an aperture of an electrical distribution panel, comprising:

an electrical distribution panel housing including a wall with an aperture sized to accommodate an electrical cable; and a cable clamp with a wedge-shaped head portion having a first side with a plurality of first angled steps, a second side forming an angle with said first side having a plurality of second angled steps depending inward, and side forming a third an angle with said first side and with said second side of at least ninety degrees, said head portion positioned in said aperture.

6. The cable clamp assembly of claim 5, wherein said third side contains a tail portion extending from said third side beyond said second side and away from said first side.

7. The cable clamp assembly of claim 5, wherein said cable clamp is formed from a single piece of plastic material.

8. A method of securing an electrical cable in an aperture of an electrical distribution panel, comprising the steps of:

providing a cable clamp with a wedge-shaped head portion, having a hypotenuse side with at least one first angled step, a base side forming an angled tip end with said hypotenuse side, said base side substantially parallel with said first angled step and having at least one second angled step from the tip end depending inward, and a tail side perpendicular to said base side having a tail portion extending from said tail side beyond said base side and away from said hypotenuse side;

inserting said cable into said aperture;

inserting said tip end of said cable clamp into said aperture adjacent said cable; and pressing said cable clamp through said aperture until said second angled step passes through said aperture, thereby squeezing said cable between said cable clamp and said aperture.

9. The method of claim 8, including the additional step of further pressing said cable clamp through said aperture until another third angled step passes through said aperture, thereby squeezing said cable between said cable clamp and said aperture.

10. A method of securing an electrical cable in an aperture of an electrical distribution panel, comprising the steps of: providing a cable clamp with a wedge-shaped head portion having a hypotenuse side with at least one first angled step, a base side forming an angled tip end with said hypotenuse side, said base side substantially parallel with said at least one first angled step and having at least one second angled step from the tip end depending inward, and a tail side transverse to said base side, said head portion positioned in said aperture.

11. The method of claim 10 wherein said tail side contains a tail portion extending perpendicularly from said tail side beyond said base side and away from said hypotenuse side.

12. The method of claim 10 wherein said hypotenuse side contains a plurality of obtusely angled steps and said base side contains a plurality of right angled steps.

13. The method of claim 10 wherein said cable clamp is formed from a single piece of plastic material.

14. A method of securing an electrical cable in an aperture of an electrical distribution panel, comprising the steps of: providing a cable clamp with a wedge-shaped head portion having a first side with a plurality of first angled steps, a second side forming an angle with said first side having a plurality of second angled steps depending inward , and a third side forming an angle with said first side and with said second side of at least ninety degrees, said head portion positioned in said aperture.

15. The method of claim 14 wherein said third side contains a tail portion extending from said third side beyond said second side and away from said first side.

16. The method of claim 14 wherein said cable clamp is formed from a single piece of plastic material.

* * * * *

UNITED STATES PATENT AND TRADEMARK OFFICE
CERTIFICATE OF CORRECTION

PATENT NO. : 6,194,660 B1
DATED : February 27, 2001
INVENTOR(S) : Doug Bradt

It is certified that error appears in the above-identified patent and that said Letters Patent is hereby corrected as shown below:

Claim 5,
Line 7, insert -- a third -- before "side forming"
Line 7, delete "a third" after "side forming"

Claim 8,
Line 11, insert -- at least one -- before "second"

Signed and Sealed this

Second Day of October, 2001

Attest:

NICHOLAS P. GODICI
Attesting Officer
Acting Director of the United States Patent and Trademark Office